(12) United States Patent
Mao et al.

(10) Patent No.: US 8,445,587 B2
(45) Date of Patent: May 21, 2013

(54) METHOD FOR MAKING REINFORCED POLYMER MATRIX COMPOSITES

(75) Inventors: Dongsheng Mao, Austin, TX (US); Zvi Yaniv, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 8 days.

(21) Appl. No.: 12/838,474

(22) Filed: Jul. 18, 2010

(65) Prior Publication Data

US 2010/0285212 A1 Nov. 11, 2010

Related U.S. Application Data

(63) Continuation-in-part of application No. 11/695,877, filed on Apr. 3, 2007, now abandoned.

(51) Int. Cl.
| | |
|---|---|
| *C08K 13/02* | (2006.01) |
| *C08K 9/02* | (2006.01) |
| *C08K 3/10* | (2006.01) |
| *C08K 3/34* | (2006.01) |
| *C08K 3/36* | (2006.01) |
| *C08K 3/38* | (2006.01) |
| *C08K 3/40* | (2006.01) |

(52) U.S. Cl.
USPC ............ 524/800; 427/222; 427/242; 524/80; 524/437; 524/439; 524/440; 524/441; 524/492; 524/493; 524/494; 524/495; 524/779; 524/780; 524/781; 524/783; 524/784; 524/847; 977/700; 977/734; 977/735; 977/742; 977/750; 977/752; 977/773; 977/775; 977/776; 977/777; 977/810

(58) Field of Classification Search
USPC ............... 524/495, 496, 35, 47, 80, 322, 437, 524/439, 440, 441, 461, 492, 493, 494, 501, 524/502, 539, 556, 779, 780, 781, 783, 784, 524/785, 786, 800, 847; 977/752, 700, 734, 977/735, 742, 750, 773, 775, 776, 777, 810; 252/299.01; 264/4.1, 4.3, 4.33, 4.6, 4.7; 349/86, 349/89, 92; 427/213.3, 213.33, 213.34, 213.36, 427/222, 242, 5; 428/402.21, 402.2, 402.22, 428/407; 430/627, 436, 438, 439, 536; 523/201, 523/205; 525/190, 417, 902; 526/264, 303.1, 526/319

See application file for complete search history.

(56) References Cited

U.S. PATENT DOCUMENTS

| | | | |
|---|---|---|---|
| 5,096,556 | A | 5/1992 | Corrigan et al. |
| 5,565,505 | A | 10/1995 | Papalos et al. |

(Continued)

FOREIGN PATENT DOCUMENTS

| | | |
|---|---|---|
| JP | 57011017 | 1/1982 |
| JP | 2003238816 | 8/2003 |

(Continued)

OTHER PUBLICATIONS

T. D. Fornes,, D. L. Hunter, and, D. R. Paul, Nylon-6 Nanocomposites from Alkylammonium-Modified Clay: The Role of Alkyl Tails on Exfoliation (2004) Macromolecules 37 (5), 7698-7709.*

(Continued)

*Primary Examiner* — Ling Choi
*Assistant Examiner* — Darcy D LaClair
(74) *Attorney, Agent, or Firm* — Kelly Kordzik; Matheson Keys & Kordzik PLLC

(57) ABSTRACT

Improved mechanical properties of either clay or carbon nanotube (CNT)-reinforced polymer matrix nanocomposites are obtained by pre-treating nanoparticles and polymer pellets prior to a melt compounding process. The clay or CNTs are coated onto the surfaces of the polymer pellets by a milling process. The introduction of moisture into the mixture of the nanoparticles and the polymer pellets results in the nanoparticles more easily, firmly, and thoroughly coating onto the surfaces of the polymer pellets.

18 Claims, 10 Drawing Sheets

U.S. PATENT DOCUMENTS

| | | | |
|---|---|---|---|
| 5,569,715 | A | 10/1996 | Grandhee |
| 5,604,269 | A | 2/1997 | Papalos et al. |
| 5,623,046 | A | 4/1997 | Papalos et al. |
| 5,652,323 | A | 7/1997 | Papalos et al. |
| 5,719,210 | A | 2/1998 | Arora et al. |
| 5,750,595 | A | 5/1998 | Arora et al. |
| 5,760,108 | A | 6/1998 | Arora et al. |
| 5,763,506 | A | 6/1998 | Papalos et al. |
| 5,786,420 | A | 7/1998 | Grandhee |
| 5,854,313 | A | 12/1998 | Omori et al. |
| 5,969,030 | A | 10/1999 | Grandhee |
| 6,090,545 | A | 7/2000 | Wohlstadter et al. |
| 6,140,045 | A | 10/2000 | Wohlstadter et al. |
| 6,294,596 | B1 | 9/2001 | Papalos et al. |
| 6,303,672 | B1 | 10/2001 | Papalos et al. |
| 6,333,016 | B1 | 12/2001 | Resasco et al. |
| 6,524,777 | B1 | 2/2003 | Whitesides et al. |
| 6,066,448 | A1 | 5/2003 | Wohlstadter et al. |
| 6,627,689 | B2 | 9/2003 | Iino et al. |
| 6,689,835 | B2 * | 2/2004 | Amarasekera et al. ........ 524/495 |
| 6,702,969 | B2 | 3/2004 | Matuana et al. |
| 6,770,583 | B2 | 8/2004 | Keller |
| 6,800,946 | B2 | 10/2004 | Chason et al. |
| 6,846,345 | B1 | 1/2005 | Keller et al. |
| 6,962,892 | B2 | 11/2005 | Resasco et al. |
| 6,971,391 | B1 | 12/2005 | Wang et al. |
| 6,986,853 | B2 | 1/2006 | Glatkowski et al. |
| 6,994,907 | B2 | 2/2006 | Resasco et al. |
| 7,005,550 | B1 | 2/2006 | Tan et al. |
| 7,073,201 | B2 | 7/2006 | Sunada et al. |
| 7,074,310 | B2 | 7/2006 | Smalley et al. |
| 7,078,683 | B2 | 7/2006 | Joyce |
| 7,094,367 | B1 | 8/2006 | Harmon et al. |
| 7,094,386 | B2 | 8/2006 | Resasco et al. |
| 7,138,444 | B2 | 11/2006 | McGee et al. |
| 7,153,903 | B1 | 12/2006 | Barraza et al. |
| 7,162,302 | B2 | 1/2007 | Wang et al. |
| 2002/0150524 | A1 | 10/2002 | Smalley et al. |
| 2003/0027357 | A1 | 2/2003 | Sigal et al. |
| 2003/0099798 | A1 | 5/2003 | George et al. |
| 2003/0151030 | A1 * | 8/2003 | Gurin ............................ 252/502 |
| 2004/0077771 | A1 | 4/2004 | Wadahara et al. |
| 2004/0089851 | A1 | 5/2004 | Wang et al. |
| 2005/0008560 | A1 * | 1/2005 | Kataoka et al. ............ 423/445 R |
| 2005/0127329 | A1 | 6/2005 | Wang et al. |
| 2005/0191491 | A1 | 9/2005 | Wang et al. |
| 2005/0229328 | A1 | 10/2005 | Tran |
| 2006/0041104 | A1 | 2/2006 | Ait-Haddou et al. |
| 2006/0270790 | A1 | 11/2006 | Comeau |
| 2007/0004857 | A1 | 1/2007 | Barraza et al. |
| 2007/0023839 | A1 | 2/2007 | Furukawa et al. |
| 2007/0183959 | A1 | 8/2007 | Charlier et al. |
| 2007/0276077 | A1 * | 11/2007 | Mao et al. ..................... 524/445 |
| 2008/0152913 | A1 | 6/2008 | Shinbach et al. |
| 2010/0158193 | A1 | 6/2010 | Bates |

FOREIGN PATENT DOCUMENTS

| | | |
|---|---|---|
| JP | 2003306607 | 10/2003 |
| JP | 2004124086 | 4/2004 |
| JP | 2004221071 | 8/2004 |
| JP | 2005-82832 A * | 2/2005 |
| JP | 2005082832 | 3/2005 |
| JP | 2005520873 | 7/2005 |
| JP | 2005255710 | 9/2005 |
| JP | 2006188389 | 7/2006 |
| JP | 2006527786 | 12/2006 |
| JP | 2007502246 | 2/2007 |
| WO | 2004/001107 | 12/2003 |
| WO | WO2005012171 | 2/2005 |
| WO | WO2005028174 | 3/2005 |
| WO | WO 2005/036563 | 4/2005 |
| WO | 2006/104689 | 10/2006 |

OTHER PUBLICATIONS

Machine Translation of JP 2005-82832.*

International Search Report and Written Opinion from the International Searching Authority, PCT/US08/78306, mailed Mar. 17, 2009, 6 pages.

European Office Action, Application No. 07759819.1, dated Oct. 8, 2009.

Gojny et al., "Influence of different carbon nanotubes on the mechanical properties of epoxy matrix composites—A comparative study," Composites Science and Technology; Apr. 21, 2005. Available online at www.sciencedirect.com.

Zhu et al., "Improving the Dispersion and Integration of Single-Walled Carbon Nanotubes in Epoxy Composites through Functionalization," Nano Letters, Jun. 26, 2003, vol. 3, No. 8, pp. 1107-1113.

International Search Report and Written Opinion from the International Searching Authority, PCT/US10/26012, mailed May 11, 2010, 7 pages.

Gonjay, F. H., et al., "Carbon nanotube-reinforced epoxy-composites: enhanced stiffness and fracture toughness at low nanotube content," Composites Science and Technology, vol. 64, Issue 15 Developments in carbon nanotube and nanofibre reinforced polymers, Nov. 2004, pp. 2363-2371, [Available Online May 14, 2004: <URL: http://www.sciencedirect.com/science/article/B6TWT-4CCNVPM-3/1/a94fb14dbf527a3eaea578dde0b0cad4>].

Gonjny, F. H., et al., "Surface modified multi-walled carbon nanotubes in CNT/epoxy-composites." Chemical Physics Letters, vol. 370, Issues 5-6, pp. 820-824. Mar. 21, 2003. [Available Online: <URL: http://www.sciencedirect.com/science/article/B6TFN-47YYBXN-7/1/b20ce49d3a5e19180f2b6a86e4159f14>].

Lam, Chun-ki et al.; Effect of Ultrasound Sonication in Nanoclay Clusters of Nanoclay/Epoxy Composites; Materials Letters: vol. 59, pp. 1369-1372, Jan. 18, 2005.

Fornes, T.D. et al.: Nylon-6 Nanocomposites from Alkylammonium-Modified Clay: The Role of Alkyl Tails on Exfoliation; Macromolecules; vol. 37, No. 5, pp. 1793-1798, Jan. 29, 2004.

Mhetre, Shamal K. et al.; Nanocomposites with Functionalized Carbon Nanotubes; Mat. Res. Soc. Symp. Proc.; vol. 788, pp. L11.17.1-L11.17.6, 2004.

International Search Report and Written Opinion from the International Searching Authority for PCT/US07/65630 Mar. 30, 2007 mailed Jun. 16, 2008, 11 pages.

Iijima, S., "Helical microtubules of graphitic carbon," Nature vol. 354, pp. 56-58 (Nov. 7, 1991). Published by Nature Publishing Group, New York, NY, USA. [Online], [Retrieved on Apr. 3, 2006]. Retrieved from the Internet: <URL: http://www.nature.com/nature/journal/v354/n6348/abs/354056a0.html>.

Wong, E., et al., "Nanobeam Mechanics: Elasticity, Strength, and Toughness of Nanorods and Nanotubes," Science vol. 277, pp. 1971-1975 (Sep. 26, 1977).

Cho, J.W. et al.; Nylon 6 Nanocomposites by Melt Compounding; Polymer; vol. 42, 2001, pp. 1083-1094. Feb. 24, 2000.

Ratna. D et al.; Clay-reinforced Epoxy Nanocomposites; Polymer International; vol. 52, 2003, pp. 1403-1407, 2003.

Salahuddin, N. et al.; Nanoscale Highly Filled Epoxy Nanocomposite; European Polymer Journal; vol. 38, pp. 1477-1482, May 8, 2000.

Zhang, Kailiang et al.; Preparation and Characterization of Modified-Clay-Reinforced and Toughened Epoxy-Resin Nanocomposites: Journal of Applied Polymer Science; vol. 91, 2004, pp. 2649-2652. Jan. 24, 2003.

European Examiner Gerhard Hillebrand, European Search Report for Application No. PCT/US2007/065630, dated Aug. 5, 2009, 3 pages.

Thostenson et al.; Carbon Nanotube/Carbon Fiber Hybrid Multiscale Composites; Journal of Applied Physics; vol. 91, No. 9, May 1, 2002.

International Search Report and Written Opinion from the International Searching Authority for PCT/US08/78306 filed Sep. 30, 2008, 5 pages, Mailed Mar. 17, 2009.

Georgakilas et al. "Organic Derivatization of Single-Walled Carbon Nanotubes by Claims and Intercalated Derivatives," Carbon 42, (2004), pp. 865-870.

www.microfluidicscorp.com/images/stories/pdf/hc.pdf, Microfluidics (1998).

International Search Report and Written Opinion from the International Searching Authority for PCT/US07/65923 filed Apr. 4, 2007. mailed Jun. 6, 2008, 9 pages.

Derwent Acc No. 1982-16395E (1982) Abstract for Ishikawa, K., Sugimoto, H., and Yamamoto, T., Publications JP 57011017 and JP 83046245.

Machine Translation of JP 2005082832 (Mar. 2005).

International Searching Authority, International Preliminary Report on Patentability, International Application No. PCT/US2008/078306, mailed Feb. 3, 2011.

The State Intellectual Property Office of the People's Republic of China, Notice on the First Office Action, Application No. 200780017502.3, Jul. 1, 2011.

The State Intellectual Property Office of the People's Republic of China, Notice on the First Office Action, Application No. 200780015723.7, Apr. 6, 2011.

International Bureau of WIPO, International Preliminary Report on Patentability and Written Opinion, International Application No. PCT/US2010/026012, Sep. 13, 2011.

International Searching Authority, International Search Report and Written Opinion, PCT/US11/44298, mailed Dec. 6, 2011, 7 pages.

Japan Patent Office, Notice of Reasons for Rejection. Japanese Patent Application No. 2009-504437, Feb. 7, 2012.

Japan Patent Office, Notice of Reasons for Rejection, Japanese Patent Application No. 2009-503306, Feb. 28, 2012.

Japan Patent Office, Notice of Allowance. Japanese Patent Application No. 2009-504437, Jun. 21, 2012.

The State Intellectual Property Office of the People's Republic of China, Notice on the Third Office Action, Application No. 200780015723.7, Jun. 18, 2012.

The State Intellectual Property Office of the People's Republic of China, Notice on the Second Office Action, Application No. 200780017502.3, Jun. 6, 2012.

United States Patent & Trademark Office, Notice of Allowance and Fees Due, U.S. Appl. No. 12/180,359, dated Aug. 2, 2012.

United States Patent & Trademark Office, Notice of Allowance and Fees Due, U.S. Appl. No. 12/838,474, dated Aug. 1, 2012.

* cited by examiner

METHOD FOR MAKING REINFORCED POLYMER MATRIX COMPOSITES

This application for patent is a continuation-in-part of U.S. patent application Ser. No. 11/695,877, which claims priority to U.S. Provisional Patent Application Ser. Nos. 60/789,300 and 60/810,394, which are all hereby incorporated by reference herein.

BACKGROUND INFORMATION

Nanocomposites are composite materials that contain particles in a size range of 1-100 nanometers (nm). These materials bring into play the submicron structural properties of molecules. These particles, such as clay and carbon nanotubes (CNTs), generally have excellent properties, a high aspect ratio, and a layered structure that maximizes bonding between the polymer and particles. Adding a small quantity of these additives (0.5-5%) can increase many of the properties of polymer materials, including higher strength, greater rigidity, high heat resistance, higher UV resistance, lower water absorption rate, lower gas permeation rate, and other improved properties (see T. D. Formes, D. L. Hunter, and D. R. Paul, "Nylon-6 nanocomposites from Alkylammonium-modified clay: The role of Alkyl tails on exfoliation," Macromolecules 37, pp. 1793-1798 (2004), which is hereby incorporated by reference herein).

However, dispersion of the nanoparticles is very important to reinforce polymer matrix nanocomposites. Such dispersion of nanoparticles in the polymer matrix has been a problem. That is why those nanoparticle-reinforced nanocomposites have not achieved excellent properties as expected (see Shamal K. Mhetre, Yong K. Kim, Steven B. Warner, Prabir K. Patra, Phaneshwar Katangur, and Autumn Dhanote, "Nanocomposites with functionalized carbon nanotubes," Mat. Res. Soc. Symp. Proc. Vol. 788 (2004), which is hereby incorporated by reference herein). Researchers have claimed that in-situ polymerization of the nanocomposites can improve the dispersion of the nanoparticles (see Werner E. van Zyl, Monserrat Garcia, Bernard A. G. Schrauwen, Bart J. Kooi, Jeff Th. M. De Hosson, Henk Verweij, "Hybrid Polyamide/Silica Nanocomposites: Synthesis and Mechanical Testing," Macromol. Mater. Eng. 287, 106-110 (2002), which is hereby incorporated by reference herein). Better properties of the nanocomposites were somehow obtained. However, in-situ polymerization is not proven to be an acceptable manufacturing process for polymer production. Also used has been a melt compounding process, which is a more popular and manufacturable process to make nanoparticle-reinforced polymer nanocomposites (see Eric Devaux, Serge Bourbigot, Ahmida El Achari, "Crystallization behavior of PA-6 clay nanocomposite Hybrid," Journal of Applied Polymer Science, Vol. 86, 2416-2423 (2002), which is hereby incorporated by reference herein), but the results have not been satisfactory.

DETAILED DESCRIPTION

Figure 1:
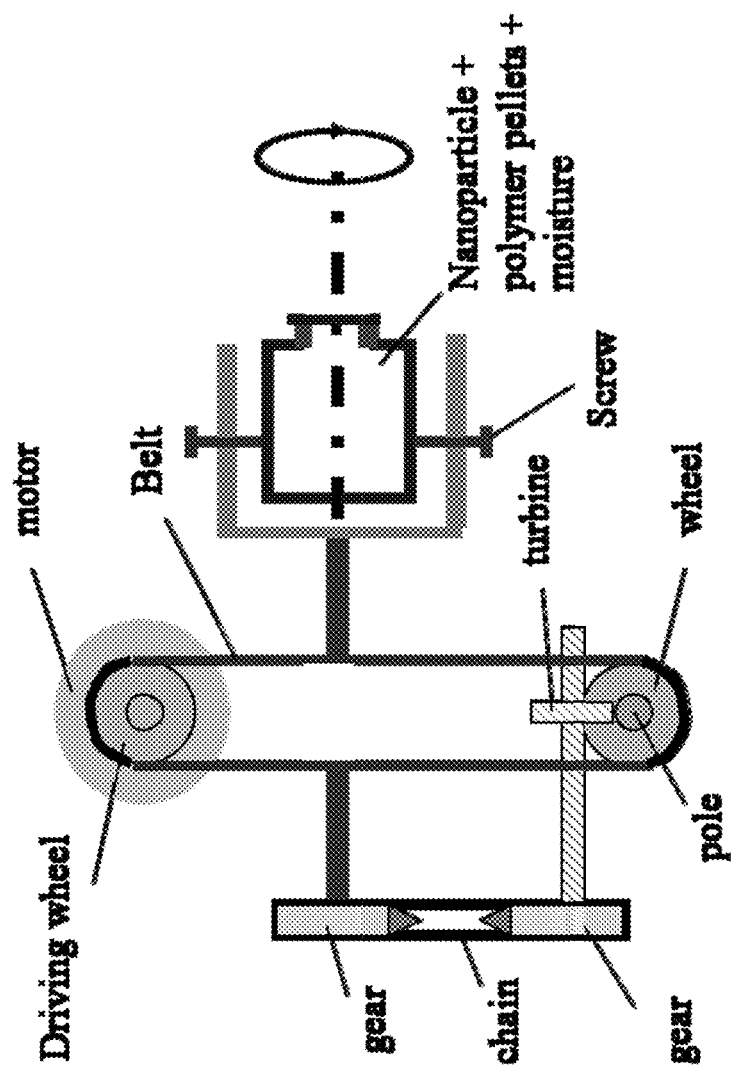
FIG. 1 illustrates a schematic diagram of a milling apparatus.

Improved mechanical properties of either clay or carbon nanotube (CNT)-reinforced polymer matrix nanocomposites are obtained by pre-treating nanoparticles and polymer pellets prior to a melt compounding process. The clay or CNTs are coated onto the surfaces of the polymer pellets by a milling process (e.g., utilizing a ball mill or apparatus of performing an equivalent process). FIG. 1 illustrates an example of such an apparatus for performing a milling process in accordance with aspects of the present invention. The introduction of moisture into the mixture of the nanoparticles and the polymer pellets results in the nanoparticles more easily, firmly, and thoroughly coating onto the surfaces of the polymer pellets. The nanoparticle thin film is formed onto the surfaces of the polymer pellets after the mixture is ground for a certain time. In this disclosure, the term "ground" will refer to the process performed by the milling process. Furthermore, though certain time periods, temperatures, revolutions per minute, etc. are provided as parameters for the disclosed processes, the invention should not be limited to such parameters, but should be expanded to alternative parameters that perform a substantially equivalent function or produce substantially equivalent result.

The milling process described herein with added moisture:
1. Causes nanoparticles to attach onto the surfaces of the polymer pellets.
2. Breaks down large clusters of the nanoparticles by the bombardment of the mixture of the nanoparticles and the polymer pellets, which further disperses the nanoparticles in the polymer matrix after the melt compounding process.
3. Results in diminishing of the nanoparticles dislodging from the pellets when the nanoparticle-coated polymer pellets are fed into the apparatus during the melt compounding process because the nanoparticles are better adhered onto the polymer pellets. Because nanoparticles are potentially harmful to humans, from a safety point of view, the nanoparticle-coated polymer pellets are a safer material to handle for humans and safer for the environment during the compounding process.
4. Results in a much more even loading of the CNTs in the polymer during the melt compounding process.

Cases are described hereinafter to illustrate aspects of the invention. For these examples, nylon 6 and/or nylon 11 were utilized as the polymer matrix, and nanoclay and/or CNTs as the nanoparticles. Other fillers such as graphite particles, carbon fibers, fullerenes, carbon nanotubes, ceramic particles, glass particles, metal particles, metal alloy particles, or any combination thereof may also be utilized. Other types of polymers including, but not limited to, thermoplastic and thermosetting polymers, may be used in place of, or together with, nylon 6 and/or nylon 11. Thermoplastic polymers that may be used as described herein include, but are not limited to, polycarbonates, polyamides, polyesters (e.g., polybutylene terephthalate and polyethylene terephthalate), polyethers, thermoplastic polyurethanes, polyacetals, fluorinated polymers (e.g., polyvinylidene fluoride), polyethersulfones, polyolefins (e.g., polyethylene and polypropylene), polyimides, polyacrylates (polymethylmethacrylate), polyphenylene oxides, polyphenylene sulfides, polyether ketones, polyarylether ketones, styrene polymers (e.g., polystyrene), styrene copolymers (e.g., styrene acrylonitrile copolymers), acrylate rubbers, acrylonitrile-butadiene-styrene block copolymers, polyvinyl chloride, or any combination thereof. Thermosetting polymers that may be used as described herein include, but are not limited to, epoxies, phenolics, cyanate esters (CEs), bismaleimides (BMIs), polyimides, or any combination thereof.

The nanoparticles are coated onto the surfaces of the pellets by a milling process as previously disclosed. The pellets are then heated to form a molten liquid at certain temperatures and melt compounded or cured to form a nanocomposite. Further mixing such as stirring or ultrasonication may be performed before the curing process. Thermosetting polymers that are in liquid form at room temperature (e.g., EPON® Resin 828 epoxy) may be cooled to a lower temperature to form a solid material. The solid material may then be broken into pellets. The milling process may be performed at lower temperatures for polymers that are liquid at room temperature than polymers that are solid at room temperature.

Case 1: Nylon 6/Multiwall Carbon Nanotube (MWNT) Nanocomposites

Nylon 6 pellets, such as commercially available from UBE Co., Japan (product name: SF1018A) were utilized. The carbon nanotubes used in this case were MWNTs (such as commercially available from Bayer MaterialScience, product name—Baytubes, grade—C 150P). The average diameter of the MWNTs was approximately 13 nanometers (nm) with a length of 5-20 μm (micrometers or microns).

Figure 2:
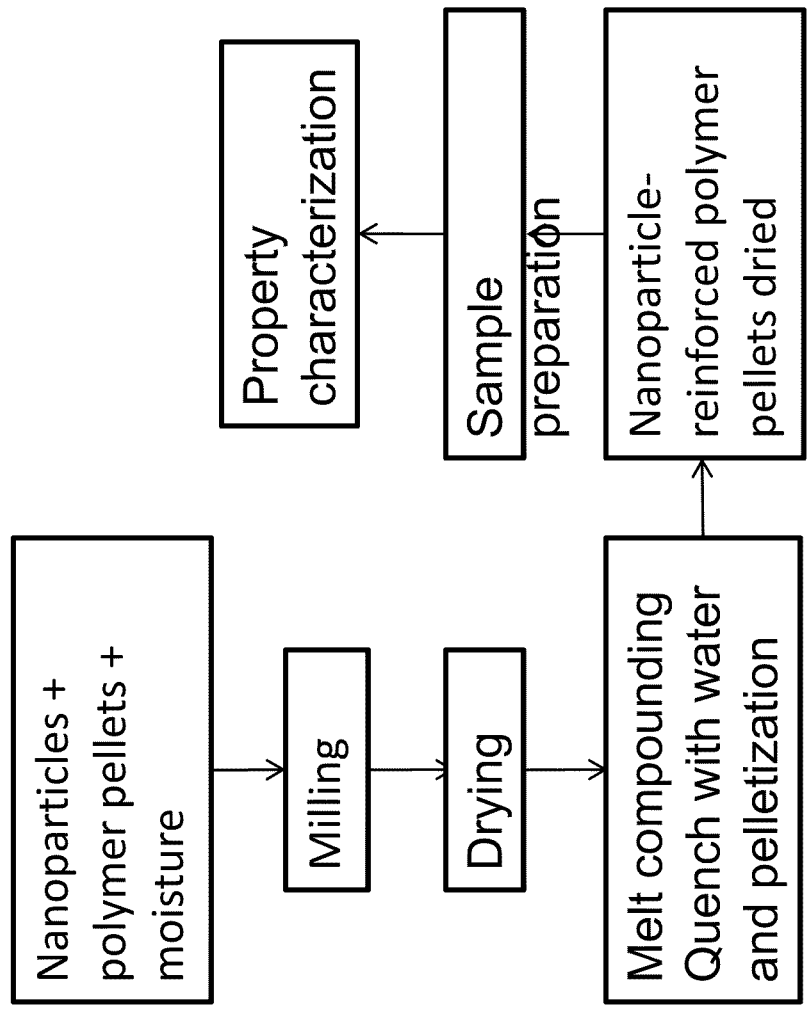
FIG. 2 illustrates a flow diagram of manufacturing nanoparticle reinforced polymer nanocomposites.

Referring to FIG. 2, in step 201, both MWNTs and nylon 6 pellets were dried in a vacuum oven at 80° C. for approximately 16 hours to eliminate any moisture. Then they were inserted in a glass container to go through the milling process. In this case, 0.4 wt. % CNTs were used in a nylon 6 matrix. The mixture of MWNTs (1.82 g (grams)) and nylon 6 (454 g) pellets was ground at 60 rev/min (revolutions per minute) for approximately 6 hours. The MWNTs were then coated onto the surfaces of the nylon 6 pellets. Portions of the MWNTs were coated onto the surfaces of the nylon 6 pellets. However, separation between the MWNTs and the nylon 6 pellets was also observed. The mixture was ground for a further amount of time, but it did not improve the coating of the MWNTs onto the surfaces of the nylon 6 pellets. Separation between the MWNTs and the nylon 6 pellets was still observed.

It was found that the introduction of moisture makes it easier for the MWNTs to be coated onto the surfaces of the nylon 6 pellets. Therefore, in another example, the MWNTs and nylon 6 pellets were dried in a vacuum oven at 80° C. for approximately 16 hours. 5 ml of water was added into the mixture of MWNTs (1.82 g) and nylon 6 (454 g) pellets in a glass container which was ground at 60 rev/min for approximately 2 hours. In this example, the MWNTs were fully coated onto the surfaces of the nylon 6 pellets. No separation between the MWNTs and the nylon 6 pellets was observed. The water was absorbed by both the MWNTs and nylon 6 pellets, with no water separated from the mixture. Because the MWNT-coated nylon 6 pellets had moisture (water was absorbed), the mixture was dried in a vacuum oven at 80° C. for approximately 16 hours to eliminate the moisture. There was no separation observed between the MWNTs and the nylon 6 pellets after this drying process.

In order to determine whether alternative solvent/liquid(s) would also work, 5 ml of IPA (isopropyl alcohol) was added in the mixture of MWNTs (1.82 g) and nylon 6 (454 g) pellets in a glass container, which was then ground at 60 rev/min for approximately 2 hours. No separation between the MWNTs and the nylon 6 pellets was observed. The mixture was dried in a vacuum oven at 80° C. for approximately 16 hours to eliminate the moisture. No separation was observed between the MWNTs and the nylon 6 pellets after this drying process.

Other solvents, such as acetone, methanol, ethanol, etc, will also work for the processes described herein. Vapor and stream of water, IPA, acetone, methanol, ethanol, and other solvents will also work when introduced into the mixture of the nanoparticles and the polymer pellets. With respect to all of the embodiments disclosed herein, when any of the terms "water," "moisture," and/or "solvent" are used, it should be understood that these terms are interchangeable.

Figure 3:
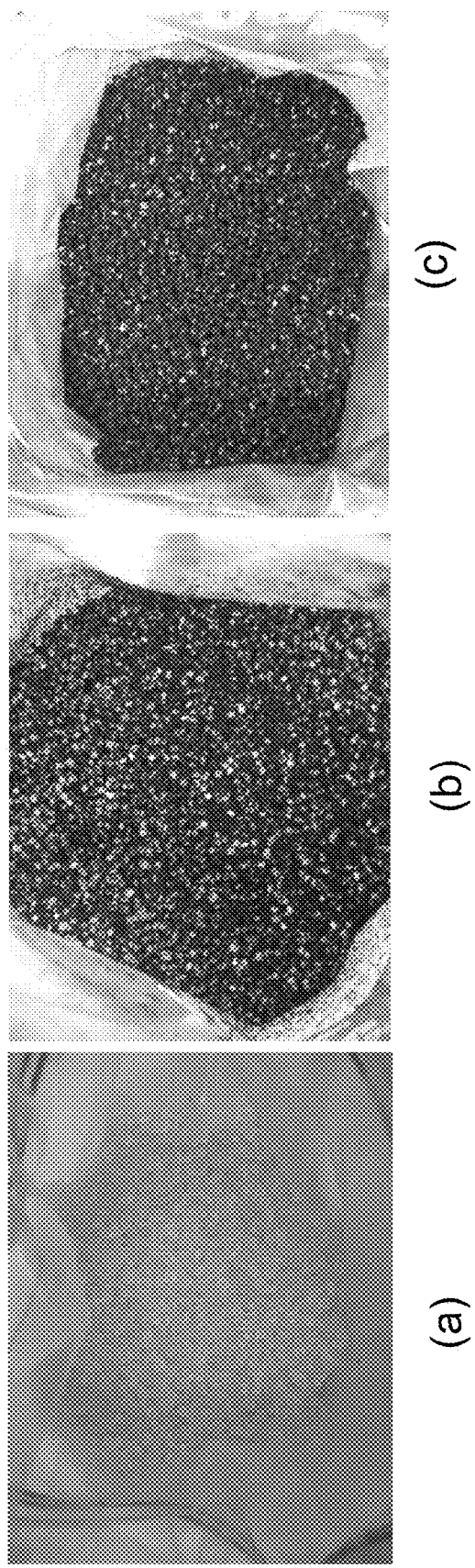
FIG. 3 shows digital photographs of (a) neat nylon 6 pellets, (b) a mixture of MWNT (0.4 wt. %)+nylon 6 pellets after a milling process (without moisture (e.g., water)), and (c) a mixture of MWNT (0.4 wt. %)+nylon 6 pellets after a milling process (with moisture (e.g., water))

FIG. 3 shows digital photographs of neat nylon 6 pellets (see FIG. 3(a)), which are transparent; MWNT-coated nylon 6 pellets without the addition of a solvent (e.g., water) (see FIG. 3(b)) in which portions of the MWNTs are separated from the nylon 6 pellets (as indicated by the particles adhering to the sides of the plastic container containing the pellets); and, MWNT-coated nylon 6 pellets with the addition of a solvent (e.g., water) (see FIG. 3(c)) in which the MWNTs are coated onto the surfaces of the nylon 6 pellets without any separation between the MWNTs and nylon 6 pellets. For the MWNTs-coated nylon 6 pellets ground with a solvent (e.g., water), no separation between the MWNTs and the nylon 6 pellets was observed after the drying process.

A determination was then made whether the process of MWNT coating on the surfaces of the nylon 6 pellets is beneficial for the properties of the MWNT-reinforced nylon 6 nanocomposite. The MWNT/nylon 6 mixture was melt compounded by an extrusion process to make a nanocomposite. In this case, the electrical resistivity of the MWNT-reinforced nylon 6 nanocomposite was characterized. The following mixtures were prepared into MWNT-reinforced nylon 6 nanocomposites:

(1) MWNTs (0.4 wt. %)+nylon 6 (no milling process of the mixture was utilized, thus the MWNTs were separated from the nylon 6 pellets);

(2) MWNTs (0.4 wt. %)+nylon 6 (milling process was utilized, but without the introduction of a solvent, such as water. This is the case as shown in FIG. 3(b));

(3) MWNTs (0.4 wt. %)+nylon 6 (milling process was utilized and a solvent, such as water, was introduced. This is the case as shown in FIG. 3(c)).

All the above mixtures were dried in a vacuum oven at 80° C. for approximately 16 hours prior to the melt compounding process. A HAAKE Rheomex CTW 100 twin screw extruder was utilized to melt compound MWNT/nylon 6 nanocomposites. Following are the parameters used in this process:

Screw zone 1 temperature—240° C.;
Screw zone 2 temperature—230° C.;

Screw zone 3 temperature—230° C.;
Die temperature—220° C.;
Screw speed—100 rpm.

The compounded nanocomposite fiber was quenched in water immediately after the compounding process and palletized utilizing a Haake PP1 Pelletizer POSTEX. The nanocomposite pellets were dried in a vacuum oven at 80° C. for approximately 16 hours prior to the next procedure. MWNT-reinforced nylon 6 nanocomposite sheets were then made by utilizing a hot pressing process for surface resistivity testing at a temperature of 230° C. The thicknesses of the sheets were approximately 100 μm. For comparison, a sheet of the neat nylon 6 was also made. Table 1 shows the surface resistivity of the MWNT-reinforced nylon 6 nanocomposites (samples) at a MWNT loading of 0.4 wt. %.

TABLE 1

| Sample # | Material | Surface resistivity ohm/square (Ω/□) |
|---|---|---|
| 1 | Neat nylon 6 | >$10^{12}$ |
| 2 | MWNT(0.4 wt. %)/nylon 6* | $6.4 \times 10^8$ |
| 3 | MWNT(0.4 wt. %)/nylon 6** | $8.8 \times 10^6$ |
| 4 | MWNT(0.4 wt. %)/nylon 6*** | $1.8 \times 10^6$ |

*MWNTs were separated from the nylon 6 before compounding (no milling process was utilized)
**Milling process was used but without introduction of water for coating MWNTs onto the surfaces of the nylon 6 pellets.
***Milling process was used and water was introduced for coating MWNTs onto the surfaces of the nylon 6 pellets.

Table 1 shows that the neat nylon 6 sheet (sample #1) is insulating (surface resistivity >$10^{12}$Ω/□). The mixture of the MWNTs and the nylon 6 pellets produced through the milling process associated with sample #3 had a surface resistivity two orders lower than the mixture produced without the process (sample #2). When the solvent was introduced into the milling process, the surface resistivity of the sample was further lowered (sample #4). The resistivity of CNT-reinforced polymer nanocomposites is lowered with better dispersion of the CNTs (see Hui Chen, Harish Muthuraman, Paul Stokes, Jianhua Zou, Xiong Liu, Jinhai Wang, Qun Huo, Saiful I Khondaker, and Lei Zhai, "Dispersion of carbon nanotubes and polymer nanocomposite fabrication using trifluoroacetic acid as a co-solvent," Nanotechnology 18(41), 415607 (2007), which is hereby incorporated by reference herein). Thus, in this case, sample #4 has the best dispersion of the MWNTs compared with samples #2 and #3. It also indicates that the milling process of the MWNT and nylon 6 pellets significantly improves the dispersion of the MWNTs. And, introduction of a solvent during the milling process further improves the dispersion.

Case 2: Nylon 6/Multiwall Carbon Nanotube (MWNT) Nanocomposites at Higher Loading of the MWNTs.

Figure 4:
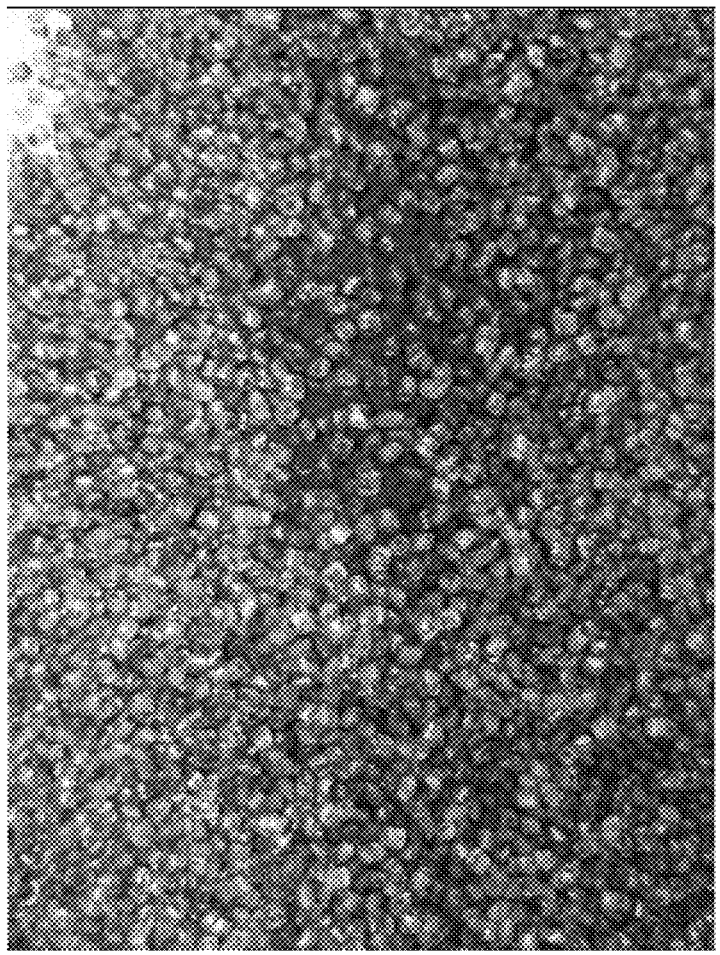
FIG. 4 shows a digital photograph of a mixture of MWNT (3.0 wt. %)+nylon 6 pellets after a milling process (without moisture (e.g., water))

A first mixture of the MWNTs and nylon 6 was processed through the milling process at a MWNT loading of 3 wt. % (14.25 g MWNTs with 454 g nylon 6 pellets). 454 g nylon 6 pellets and 14.25 g MWNTs were added into a glass container (so the content of the MWNTs in the mixture is 3 wt. %). The mixture was ground using a tumbler at a speed of 50 rev/min for 6 hours. FIG. 4 shows a digital photograph of the mixture after the ground process. It can be seen that the majority of the MWNTs were not coated onto the surfaces of the nylon 6 pellets. The loading of the MWNTs coated onto the surfaces of the nylon 6 pellets was around 0.2 wt. %, which was weighed calculated after the separated MWNTs were removed.

Figure 5:
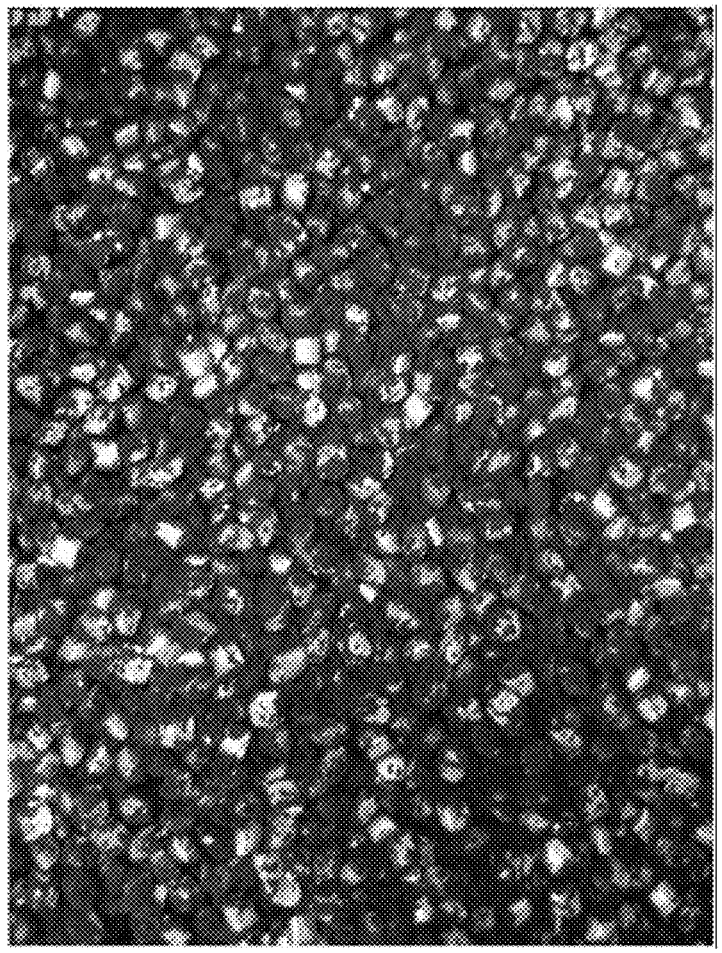
FIG. 5 shows a digital photograph of a mixture of MWNT (3.0 wt. %)+nylon 6 pellets after a milling process (with 10 ml solvent)

A second mixture of 454 g nylon 6 pellets and 14.25 g MWNTs was added into a glass container. 10 ml of ionized water was also added to the container. The mixture was ground using the tumbler at a speed of 50 rev/min for approximately 6 hours. FIG. 5 shows a digital photograph of the mixture after the ground process. It can be seen that a portion of the MWNTs were coated onto the surfaces of the nylon 6 pellets. However, severe separation was observed between the MWNTs and the nylon 6 pellets. The loading of the MWNTs coated onto the surfaces of the nylon 6 pellets was around 1.0 wt. %, which was weighed calculated after the separated MWNTs were removed.

Figure 6:
FIG. 6 shows a digital photograph of a mixture of MWNT (3.0 wt. %)+nylon 6 pellets after a milling process (with 45 ml solvent)
Figure 7:
FIG. 7 shows a magnified digital photograph of image in FIG. 6.
Figure 8:
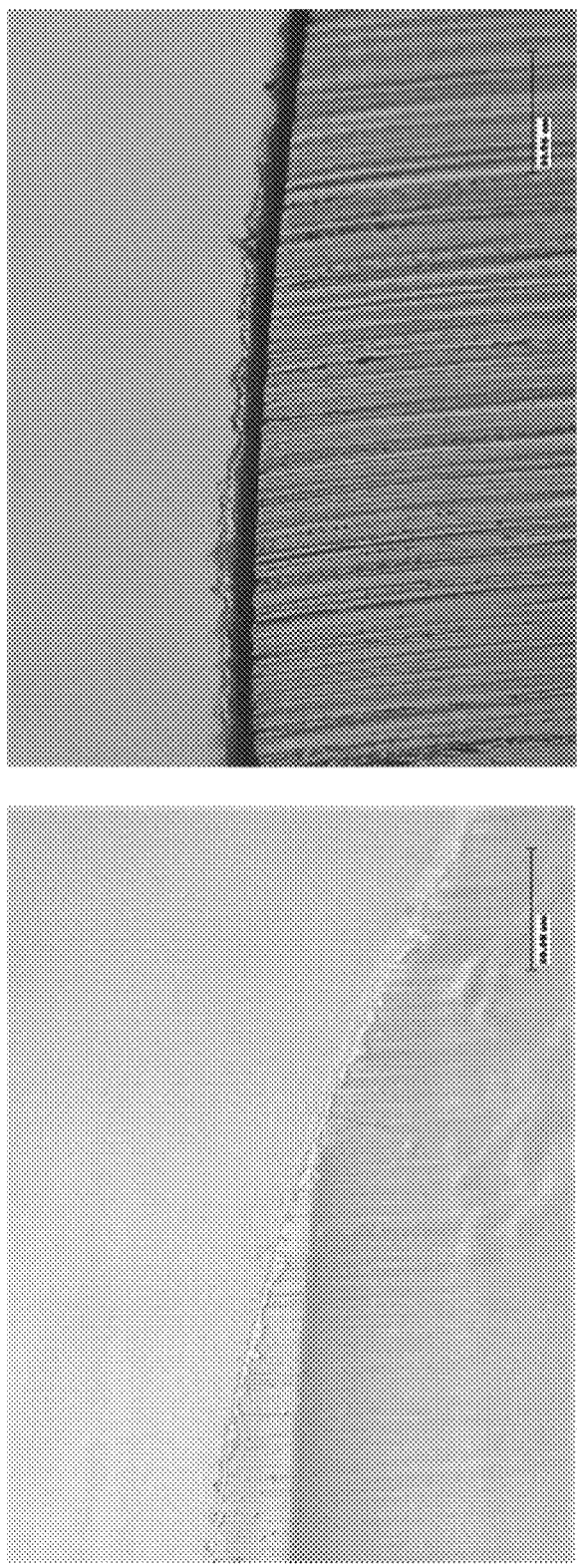
FIG. 8 shows a digital photograph of a cross-section view of the neat nylon 6 pellets (left) and 3.0 wt. % MWNTs coated onto the surfaces of the nylon 6 pellets (right)

A third mixture of 454 g nylon 6 pellets and 14.25 g MWNTs was added into a glass container. 45 ml of ionized water was also added to the container. The mixture was ground using the tumbler at a speed of 50 rev/min for approximately 6 hours. FIG. 6 shows a digital photograph of the mixture after the ground process. FIG. 7 shows a higher magnification digital photograph of FIG. 6 showing that the MWNTs were successfully coated onto the surfaces of the nylon 6 pellets. There was not any separation between the MWNTs and the nylon 6 pellets. There was also not any separation between the MWNTs and the nylon 6 pellets after this mixture was dried in a vacuum at 80° C. for approximately 16 hours. FIG. 8 shows a digital photograph of cross-section views of the neat nylon 6 pellets (left) and 3.0 wt. % MWNTs coated onto the surfaces of the nylon 6 pellets (right), which shows that the coating of the MWNTs on the nylon 6 pellets is uniform and smooth.

The above mixtures were dried in a vacuum at 80° C. for approximately 16 hours for the melt compounding process as similarly described in case 1. For comparison, the mixture of the MWNTs (3.0 wt. %) and the nylon 6 pellets without the milling process was also compounded. The compounded nanocomposite fiber was quenched in water after the compounding process and palletized. MWNT-reinforced nylon 6 nanocomposite sheets were then made by using a hot pressing process for surface resistivity testing at a temperature of 230° C. The thicknesses of the sheets were approximately 100 μm. For comparison, a sheet of the neat nylon 6 was also made. Table 2 shows the surface resistivity of the MWNT-reinforced nylon 6 nanocomposites (samples) at a MWNT loading of 3.0 wt. %.

TABLE 2

| Sample # | Material | Surface resistivity (Ω/□) |
|---|---|---|
| 5 | MWNT(3.0 wt. %)/nylon 6* | $6.4 \times 10^5$ |
| 6 | MWNT(3.0 wt. %)/nylon 6** | $1.8 \times 10^5$ |
| 7 | MWNT(3.0 wt. %)/nylon 6*** | $8.8 \times 10^4$ |
| 8 | MWNT(3.0 wt. %)/nylon 6**** | $2.3 \times 10^4$ |

*MWNTs were separated from the nylon 6 before compounding (no milling process was utilized).
**Milling process was used but without introduction of water for coating MWNTs onto the surfaces of the nylon 6 pellets.
***Milling process was used and water was introduced for coating MWNTs onto the surfaces of the nylon 6 pellets (454 g nylon 6 pellets + 14.25 g MWNTs + 10 ml water).
****Milling process was used and water was introduced for coating MWNTs onto the surfaces of the nylon 6 pellets (454 g nylon 6 pellets + 14.25 g MWNTs + 45 ml water).

Figure 9:
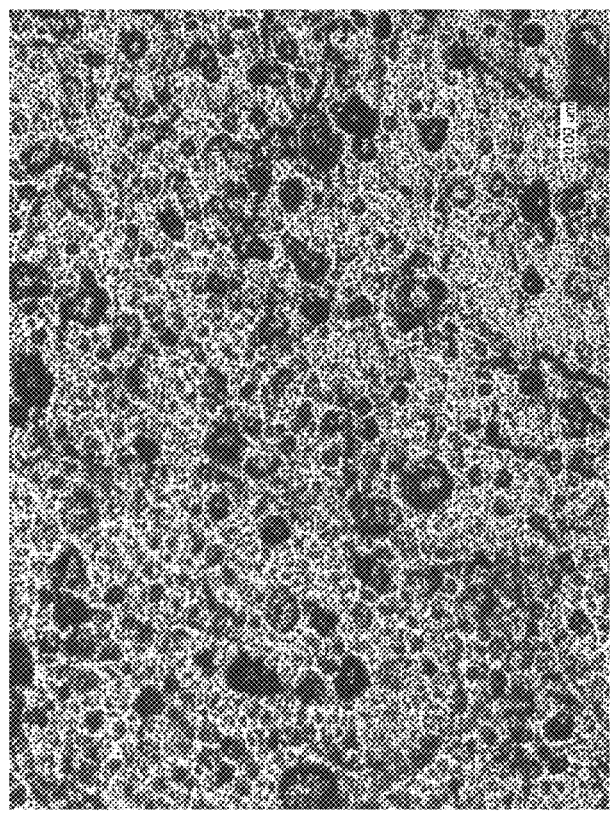
FIG. 9 shows digital photographs of (a) MWNT (3.0 wt. %) reinforced nylon 6 nanocomposite (no milling process before melt compounding process), and (b) MWNT (3.0 wt. %) reinforced nylon 6 nanocomposite (a milling process was utilized of the mixture with the moisture (e.g., water) before melt compounding process)
Figure 9:
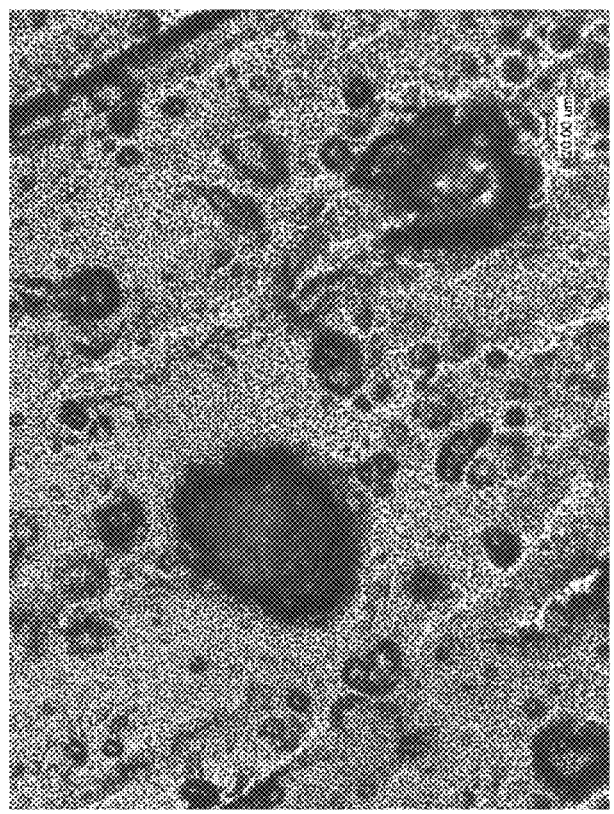
Figure 10:
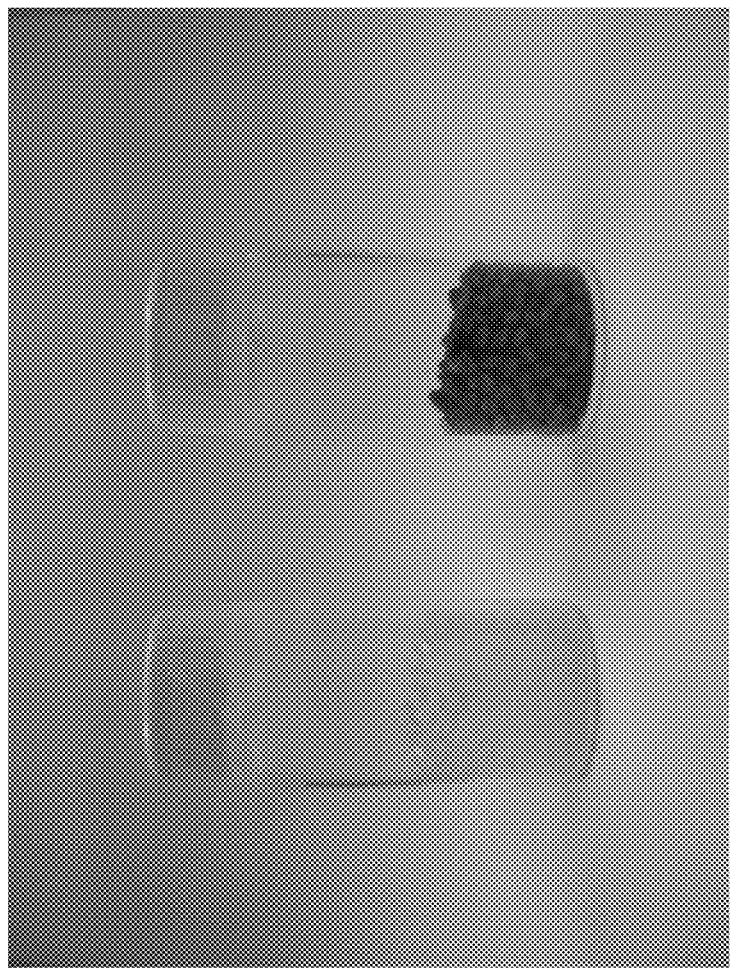
FIG. 10 shows a digital photograph of neat nylon 6 pellets (left) and 0.4 wt. % DWNT coated onto the surfaces of the nylon 6 pellets (right).

It can be seen that the surface resistivity of the samples is lower if more MWNTs are coated onto the surfaces of the nylon 6 pellets. If the MWNTs (3 wt. %) are fully coated onto the surfaces of the nylon 6 pellets (sample #8), the surface resistivity of the nanocomposite is almost 30 times lower than that of the mixture without milling process (sample #5). FIG. 9 shows optical microscopic images of samples #5 (FIG. 9(a)) and #8 (FIG. 9(b)). It can be seen that if the mixture of the MWNTs and the nylon 6 is processed through the milling process with water (or other solvent), the MWNTs are much more dispersed than the sample #5 without milling process (large MWNT clusters at sizes of 100 μm are seen). It also confirms that in Case 1, the MWNTs were better dispersed when the mixture of the MWNTs and nylon 6 pellets was processed through the milling process.

Alternatively, 10 wt. % of MWNTs was fully coated onto the surfaces of the nylon 6 pellets using 120 ml of water as the moisture. After the drying process, no separation between the MWNTs and the nylon 6 pellets occurred. Higher loading of the MWNTs (>10 wt. %) can be fully coated onto the surfaces of the nylon 6 pellets when a certain quantity of moisture is introduced during the milling process.

Case 3: Nylon 6/Double Wall Carbon Nanotube (DWNT) Nanocomposites

The DWNTs were commercially obtained from Nanocyl, Inc., Belgium. These DWNTs were purified and had an average diameter of 2-5 nm at a length of 5-20 μm.

The following mixtures were run through the milling process:

1. DWNT (0.4 wt. %)+nylon 6 pellets (1.82 g DWNTs+454 g nylon 6 pellets);
2. DWNTs (1.0 wt. %)+nylon 6 pellets (4.59 g DWNTs+ 454 g nylon 6 pellets);
3. DWNTs (1.0 wt. %)+nylon 6 pellets+water (4.59 g DWNTs+454 g nylon 6 pellets+5 ml water).

The first mixture of DWNTs (1.82 g) and nylon 6 (454 g) pellets were put in a glass container and ground at 60 rev/min for approximately 6 hours (the loading of the DWNTs was 0.4 wt. %). The DWNTs coated the surfaces of the nylon 6 pellets. No separation between the DWNTs and the nylon 6 pellets was observed. In case 1 mentioned above, the MWNTs at a loading of 0.4 wt. % were not fully coated onto the surfaces of the nylon 6 pellets; since the diameters of the DWNTs are smaller than that of the MWNTs, the Van de Waals forces are stronger resulting in being more easily coated onto the surfaces of the nylon 6 pellets.

The second mixture of DWNTs (4.59 g) and nylon 6 (454 g) pellets were put in a glass container and ground at 60 rev/min for approximately 6 hours (the loading of the DWNTs was 1.0 wt. %). A portion of the DWNTs were coated onto the surfaces of the nylon 6 pellets. However, separation between the DWNTs and the nylon 6 pellets was also observed. The mixture was then further ground for a longer period of time, but it did not improve the coating of the DWNTs onto the surfaces of the nylon 6 pellets; separation between the DWNTs and the nylon 6 pellets was still observed.

Next, 5 ml water was added into the third mixture of DWNTs (4.59 g) and nylon 6 (454 g) pellets in a glass container, which were ground at 60 rev/min for approximately 2 hours. This time, the DWNTs were fully coated onto the surfaces of the nylon 6 pellets, with no separation between the DWNTs and the nylon 6 pellets. The water was absorbed by both the DWNTs and nylon 6 pellets; no water was observed separated from the mixture. Because the DWNT-coated nylon 6 pellets had some residual moisture (water was absorbed), the mixture was dried in a vacuum oven at 80° C. for approximately 16 hours to fully eliminate the moisture. There was no separation observed between the DWNTs and the nylon 6 pellets after the drying process.

In order to test whether the process of DWNT coating on the surfaces of the nylon 6 pellets was beneficial to the properties of the DWNT-reinforced nylon 6 nanocomposite, the DWNT/nylon 6 mixture was melt compounded by an extrusion process to make a nanocomposite. The electrical resistivity and mechanical properties of the DWNT-reinforced nylon 6 nanocomposites was characterized. The following mixtures were prepared as DWNT-reinforced nylon 6 nanocomposites:

(1) DWNTs (0.4 wt. %)+nylon 6 (no milling process of the mixture was used, meaning the DWNTs were separated from the nylon 6 pellets);
(2) DWNTs (0.4 wt. %)+nylon 6 (milling process was used but without introduction of water);
(3) DWNTs (1.0 wt. %)+nylon 6 (milling process was used without water);
(4) DWNTs (1.0 wt. %)+nylon 6 (milling process was used and water was introduced);

All the mixtures were dried in a vacuum oven at 80° C. for approximately 16 hours prior to the melt compounding process. A HAAKE Rheomex CTW 100 twin screw extruder was used to melt compound DWNT/nylon 6 nanocomposites. Following are the parameters used in this process:

Screw zone 1 temperature—240° C.;
Screw zone 2 temperature—230° C.;
Screw zone 3 temperature—230° C.;
Die temperature—220° C.;
Screw speed—100 rpm.

The compounded nanocomposite fiber was quenched in water immediately after the compounding process and palletized using a Haake PP1 Pelletizer POSTEX. The nanocomposite pellets were dried in a vacuum oven at 80° C. for approximately 16 hours prior to the next procedure. DWNT-reinforced nylon 6 nanocomposite sheets were then made by using a hot pressing process for surface resistivity testing at a temperature of 230° C. The thickness of the sheets was approximately 100 μm. For comparison, a sheet of neat nylon 6 was also made. Table 3 shows the surface resistivity of the samples. A Mini-Jector (Model 55, Mini-Jector Machinery Corp. Newbury, Ohio, USA) laboratory-scale injection molding machine was used to make impact bars for physical testing. Samples were molded with specific dimensions using ASTM-specified molds (ASTM D638 for tensile strength testing; ASTM D790 for flexural modulus testing). Following are the parameters used:

Injection pressure—70 bar;
Holding pressure—35 bar;
Holding time—40 seconds;
Heating zone 1 temperature—230° C.;
Heating zone 2 temperature—230° C.;
Nozzle temperature—240° C.;
Mold temperature—60-80° C.

For comparison, neat nylon 6 specimens were also molded. The specimens were dried in a desiccator for approximately 40 hours of conditioning before the testing process.

TABLE 3

| Sample # | Material | Tensile strength (MPa) | Flexural modulus (GPa) | Surface resistivity (Ω/□) |
|---|---|---|---|---|
| 1 | Neat nylon 6 | 75 | 2.5 | >$10^{12}$ |
| 9 | DWNT(0.4 wt. %)/nylon 6* | 72 | 2.7 | $8.8 \times 10^7$ |
| 10 | DWNT(0.4 wt. %)/nylon 6** | 81 | 3.0 | $7.2 \times 10^6$ |
| 11 | DWNT(1.0 wt. %)/nylon 6*** | 82 | 3.3 | $3.2 \times 10^5$ |
| 12 | DWNT(1.0 wt. %)/nylon 6**** | 88 | 3.7 | $9.8 \times 10^4$ |

*DWNTs were separated from the nylon 6 before compounding (no milling process was utilized)
**Milling process was used but without introduction of water for coating DWNTs onto the surfaces of the nylon 6 pellets.
***Milling process was used and water was not introduced for coating DWNTs onto the surfaces of the nylon 6 pellets.
****Milling process was used and water was introduced for coating DWNTs onto the surfaces of the nylon 6 pellets (454 g nylon 6 pellets + 4.59 g DWNTs + 5 ml water).

It can be seen that the surface resistivity of the samples is lower if more MWNTs are coated onto the surfaces of the nylon 6 pellets. When the DWNTs (1.0 wt. %) are fully coated onto the surfaces of the nylon 6 pellets (sample #12), the surface resistivity of the nanocomposite is more than 3 times lower than that of the mixture milling process without moisture introduction (sample #11). Correspondingly, if the DWNTs are not coated onto the surfaces of the nylon 6 pellets (sample #9), the tensile strength is even lower than that of the neat nylon 6. These results are consistent with another publication in which it was disclosed that CNT-reinforced nylon 6 nanocomposites synthesized by a melt compounding process possess worse mechanical properties than neat nylon 6 (see Dhanote, "Nanocomposites with functionalized carbon nanotubes," Mat. Res. Soc. Symp. Proc. Vol. 788, L11.17.1-L11.17.6, which is hereby incorporated by reference herein). This means that the non-dispersed DWNT large clusters potentially perform as defects in the nylon 6 matrix and damage the mechanical properties. When the DWNTs were fully coated onto the surfaces of the nylon 6 pellets, the mechanical properties were significantly improved (samples #10 and #12). For sample #10, at the DWNT loading of 0.4 wt. %, the tensile strength and flexural modulus were improved 8% and 20%, respectively, compared to the neat nylon 6. At the DWNT loading of 1.0 wt. % (sample #12), the tensile strength and flexural modulus were improved 17% and 40%, respectively, compared to the neat nylon 6.

3 wt. % of the DWNTs were also fully coated onto the surfaces of nylon 6 pellets using 10 ml of the water as the moisture, and 10 wt. % of the DWNTs fully onto the surfaces of the nylon 6 pellets using 25 ml of the water as the moisture. After a drying process, no separation between the DWNTs and the nylon 6 pellets occurred. The higher loading of the DWNTs (>10 wt. %) can be fully coated onto the surfaces of the nylon 6 pellets when a certain quantity of moisture is introduced during the milling process.

In Cases 1-3, MWNTs and DWNTs were chosen for experimentation. However, single wall CNTs (SWNTs) may also be utilized.

Case 4: Nylon 11/Clay Nanocomposites

Nylon 11 pellets were commercially obtained from Arkema Co., Japan (product name: RILSAN® BMV-P20 PA11). Clay (particles) was commercially obtained from Southern Clay Products (product name: CLOISITE® series 93A), which is a natural montmorillonite modified with a ternary ammonium salt.

The following mixtures were processed through the milling process:
1. Clay (5.0 wt. %)+nylon 11 pellets (23.90 g clay+454 g nylon 6 pellets);
2. Clay (5.0 wt. %)+nylon 11 pellets (23.90 g clay+454 g nylon 6 pellets+30 ml of water);
3. Clay (10.0 wt. %)+nylon 11 pellets (50.04 g clay+454 g nylon 6 pellets);
4. Clay (10.0 wt. %)+nylon 11 pellets (50.04 g clay+454 g nylon 6 pellets+55 ml of water).

The first mixture of clay (23.90 g) and nylon 11 (454 g) pellets was placed in a glass container and ground at 60 rev/min for approximately 6 hours (the loading of the clay was 5.0 wt. %). The clay particles coated onto the surfaces of the nylon 11 pellets. It was observed that portions of the clay particles were coated onto the surfaces of the nylon 11 pellets. However, separation between the clay and the nylon 6 pellets was also observed. The mixture was then further ground for an additional period of time, but this did not improve the coating of the clay particles onto the surfaces of the nylon 11 pellets. Separation between the clay and the nylon 11 pellets was still observed.

30 ml ionized water was added into the second mixture of clay (23.90 g) and nylon 11 (454 g) pellets in a glass container and ground at 60 rev/min for approximately 6 hours (the loading of the clay was 5.0 wt. % in the nylon 11 matrix). The clay particles coated onto the surfaces of the nylon 11 pellets, with no observed separation between the clay particles and the nylon 11 pellets. The mixture was dried in a vacuum oven at 80° C. for approximately 16 hours to eliminate the moisture. Still there was no separation observed between the clay and the nylon 11 pellets after the drying process.

The third mixture of clay particles (50.04 g) and nylon 11 (454 g) pellets were put in a glass container and ground at 60 rev/min for approximately 6 hours (the loading of the clay was 10.0 wt. %). Clay particles coated onto the surfaces of the nylon 11 pellets. It was observed that portions of the clay particles were coated onto the surfaces of the nylon 11 pellets. However, separation between the clay and the nylon 6 pellets was also observed. The mixture was further ground for an additional period of time, but it did not improve coating of the clay particles onto the surfaces of the nylon 11 pellets. Separation between the clay and the nylon 11 pellets was still observed.

55 ml ionized water was added into the fourth mixture of clay particles (50.04 g) and nylon 11 (454 g) pellets in a glass container and ground at 60 rev/min for approximately 6 hours (the loading of the clay was 10.0 wt. % in the nylon 11 matrix). Clay particles coated onto the surfaces of the nylon 11 pellets. No separation between the clay particles and the nylon 11 pellets was observed. The mixture was dried in a vacuum oven at 80° C. for approximately 16 hours to fully eliminate the moisture. Still, there was no separation observed between the clay and the nylon 11 pellets after the drying process.

The following mixtures were prepared to clay-reinforced nylon 11 nanocomposites:
(1) Clay (5.0 wt. %)+nylon 11 pellets (no milling process of the mixture was used, meaning the clay particles were separated from the nylon 6 pellets);
(2) Clay (5.0 wt. %)+nylon 11 pellets (milling process of the mixture was used without moisture);
(3) Clay (5.0 wt. %)+nylon 11 pellets (23.90 g clay+454 g nylon 6 pellets+30 ml water for milling process);
(4) Clay (10.0 wt. %)+nylon 11 pellets (no milling process of the mixture was used, meaning the clay particles were separated from the nylon 6 pellets);
(5) Clay (10.0 wt. %)+nylon 11 pellets (50.04.90 g clay+454 g nylon 6 pellets+55 ml water for milling process).

All the above mixtures were dried in a vacuum oven at 80° C. for approximately 16 hours prior to the melt compounding process. A HAAKE Rheomex CTW 100 twin screw extruder was used to melt compound the nylon 11/clay nanocomposites. Following are the parameters used in this process:

Screw zone 1 temperature—240° C.;
Screw zone 2 temperature—230° C.;
Screw zone 3 temperature—230° C.;
Die temperature—220° C.;
Screw speed—100 rpm.

The compounded nanocomposite fiber was quenched in water after the compounding process and palletized using a Haake PP1 Pelletizer POSTEX. The nanocomposite pellets were dried in a vacuum oven at 80° C. for approximately 16 hours prior to the next procedure. A Mini-Jector (Model 55, Mini-Jector Machinery Corp., Newbury, Ohio, USA) laboratory-scale injection molding machine was used to make impact bars for physical testing. Samples were molded with specific dimensions using ASTM-specified molds (ASTM D790 for flexural modulus and ASTM D256 for notched impact testing). Following are the parameters used:

Injection pressure—70 bar;
Holding pressure—35 bar;

Holding time—40 seconds;
Heating zone 1 temperature—230° C.;
Heating zone 2 temperature—230° C.;
Nozzle temperature—240° C.;
Mold temperature—60-80° C.

For comparison, neat nylon 11 specimens were also molded. The specimens were dried in a desiccator for approximately 40 hours conditioning before the testing process.

Table 4 shows the mechanical properties (tensile strength and impact strength) of the nylon 6/CNT nanocomposites.

TABLE 4

| Sample # | Material | Flexural modulus (GPa) | Impact strength (kgf cm/cm) |
|---|---|---|---|
| 13 | Neat nylon 11 | 0.533 | 12.3 |
| 14 | Clay(5.0 wt. %)/nylon 11* | 0.928 | 21.2 |
| 15 | Clay(5.0 wt. %)/nylon 11** | 1.04 | 30.5 |
| 16 | Clay(5.0 wt. %)/nylon 11*** | 1.14 | 32.8 |
| 17 | Clay(10.0 wt. %)/nylon 11**** | 1.35 | 27.8 |
| 18 | Clay(10.0 wt. %)/nylon 11***** | 1.57 | 35.7 |

*Clay particles were separated from the nylon 11 before compounding (no milling process was utilized).
**Milling process was used but without introduction of water for coating clay onto the surfaces of the nylon 11 pellets.
***Milling process was used and water was introduced for coating clay onto the surfaces of the nylon 11 pellets.
****Milling process was used but without introduction of water for coating clay onto the surfaces of the nylon 11 pellets.
*****Milling process was used and water was introduced for coating clay onto the surfaces of the nylon 11 pellets.

It can be seen clearly that the mechanical properties of clay reinforced nylon 11 nanocomposites pre-treated by a milling process without this process (sample #14). By introducing moisture (e.g., water) into the mixture during the milling process, higher loading of the clay particles can be coated onto the surfaces of the nylon 11 pellets, and better mechanical properties are also achieved.

A mixture of clay with nylon 11 at clay loading of 20 wt. % was also processed through the milling process with moisture. The clay particles were fully coated onto the surfaces of the nylon 11 pellets when 100 ml of a solvent (e.g., water) was used. Higher loading of the clay (20 wt. %) can also be fully coated onto the surfaces of the nylon 11 pellets by introducing a certain quantity of moisture.

What is claimed is:

1. A method comprising:
a milling process to coat nanoparticles onto surfaces of polymer pellets, wherein moisture is added during the milling process, resulting in a mixture;
drying the mixture; and
compounding the mixture to make a nanocomposite.

2. The method as recited in claim 1, wherein the polymer pellets comprise thermoplastics.

3. The method as recited in claim 2, wherein the thermoplastics are selected from the group consisting of polycarbonates, polyamides, polyesters, polyethers, thermoplastic polyurethanes, polyacetals, fluorinated polymers, polyethersulfones, polyolefins, polyimides, polyacrylates, polyphenylene oxides, polyphenylene sulfides, polyether ketones, polyarylether ketones, styrene polymers, styrene copolymers, acrylate rubbers, acrylonitrile-butadiene-styrene block copolymers, polyvinyl chloride, and any combination thereof.

4. The method as recited in claim 1, wherein the polymer pellets comprise thermosets.

5. The method as recited in claim 4, wherein the thermosets are selected from the group consisting of epoxies, phenolics, cyanate esters, bismaleimides, polyimides, and any combination thereof.

6. The method as recited in claim 1, wherein the moisture is selected from the group consisting of water, IPA, acetone, methanol, and ethanol.

7. The method as recited in claim 1, wherein the moisture comprises a vapor or stream selected from the group consisting of water, IPA, acetone, methanol, and ethanol.

8. The method as recited in claim 1, wherein the nanoparticles comprise clay nanoparticles.

9. The method as recited in claim 1, wherein the nanoparticles comprise carbon nanotubes.

10. The method as recited in claim 1, wherein the nanoparticles comprise graphite particles.

11. The method as recited in claim 1, wherein the nanoparticles comprise carbon fibers.

12. The method as recited in claim 1, wherein the nanoparticles comprise fullerenes.

13. The method as recited in claim 1, wherein the nanoparticles comprise ceramic particles.

14. The method as recited in claim 1, wherein the nanoparticles comprise glass particles.

15. The method as recited in claim 1, wherein the nanoparticles comprise metal nanoparticles.

16. The method as recited in claim 1, wherein the nanoparticles comprise alloy nanoparticles.

17. The method as recited in claim 1, wherein the milling is performed with a ball mill apparatus.

18. The method as recited in claim 1, wherein the moisture is added to enhance the coating of the nanoparticles onto the surfaces of the polymer pellets.

* * * * *